[11] 3,782,809
[45] Jan. 1, 1974

Shropshire

[54] SIGHT GLASS ASSEMBLY
[75] Inventor: Lester F. Shropshire, South Charleston, W. Va.
[73] Assignee: Cyclops Industries, Inc., South Charleston, W. Va.
[22] Filed: Feb. 23, 1972
[21] Appl. No.: 228,496

[52] U.S. Cl. .................. 350/319, 73/334, 122/6.5
[51] Int. Cl. ............................................. G02b 7/00
[58] Field of Search .................. 350/319, 67, 179; 122/6.5; 73/330, 334

[56] References Cited
UNITED STATES PATENTS
3,438,540   4/1969   Roy ....................... 350/319 UX
3,407,662  10/1968   Tarbox ................... 73/330 X
3,512,354   5/1970   Jenny .................... 350/252 UX
3,380,303   4/1968   Roy ....................... 73/334

Primary Examiner—John K. Corbin
Attorney—Edward G. Atkins

[57] ABSTRACT

An improved sight glass has been devised for an annular lens container featuring a shelf between its two ends. The sight glass is constructed in such a manner that metal corroding contents of reaction vessels do not contact any metal elements of the sight glass. The shelf feature of the sight glass construction also enhances the strength and safety of the entire apparatus.

8 Claims, 3 Drawing Figures ns3,782,809

SIGHT GLASS ASSEMBLY

BACKGROUND OF THE INVENTION

A. Field of the Invention

This invention relates to a sight glass for use with chemical containing vessels. More particularly, this invention relates to a sight glass adapted to resist attack of the contents of the vessel on the glass and to withstand substantial variations in temperature and pressure.

B. Description of the Prior Act

Sight glasses commonly in use with chemical containing vessels, especially reaction vessels, as a rule, consist of a single piece of glass of suitable composition to meet the stresses due to corrosion and to changes of temperature and pressure. These glasses are conveniently mounted in the wall of said vessel in a suitable holder. However, the glasses are vulnerable to breakage due to improper packing of the glass in the holder and to uneven tension on the holder when mounted on the vessel. Moreover, if breakage does occur, the glass often cannot support the pressure in the vessel and may shatter before it can be replaced.

It has also been known to form sight glass lenses of several layers of glass, either independent of one another or bonded to form a laminate. The lenses are mounted in a suitable holder and supported therein by a solid resilient packing material usually in the form of cushion rings at the outer and inner ends of the lens assembly. However, these lenses, due to their thickness, are very rigid and even more vulnerable to breakage due to improperly adjusted packing or uneven tension on the holder. For example, if too much pressure is exerted on the packing material, the inner ring thereof may exert extreme compressive stresses on the innermost layer of glass and crush the same. Additionally, the packing may tend to leak due to expansion and contraction of the glass corresponding to changes in temperature within the vessel. Also when these multiple layer lenses need replacement, it is a complicated and tedious procedure, and the vessel is out of operation for extended periods of time. In all known sight glasses there is great difficulty in maintaining a tightly sealed joint between the lens and the support.

Another sight glass commonly in use consists of two major components, a lens holding sleeve and a mounting support. The lens holding sleeve is adapted to receive the lens and is further provided with an integral flange to seat against an opening in a reaction vessel. The lens is bonded in the lens holding sleeve with a high temperature, high shear strength cohesive and the sleeve is received in the mounting support which is provided with means to secure the flange of the lens holding sleeve in fixed engagement with the vessel. In a preferred construction the lens is completely surrounded at points of stress by resilient gaskets and the lens is not subject to stresses except those from within the vessel. Such sight glasses may be found in U.S. Pat. Nos. 3,307,400 and 3,148,543. Although these sight glasses are efficient and solve many problems of the prior art, if a leak develops around the gasket because of high temperature and corrosive materials in the vessel and if the corrosive material reaches the bonding cohesive, the cohesive material may be destroyed. The types of sight glasses previously used in reaction vessels have also demonstrated a lack of strength and a lack of safety when used in conjunction with reaction vessels.

It has also been found that where certain reaction vessels are glass lined because of corrosive contents, it is also necessary to glass line certain portions of the sight glass elements to protect against corrosion of metal parts of the sight glass. The glass coating required for these sight glasses has proven to be particularly expensive.

It is therefore an object of this invention to provide a sight glass for reaction vessels which are safer and stronger than sight glasses previously known to the art.

It is still a further object of this invention to provide a sight glass wherein replacement of damaged lens is efficiently and quickly performed.

It is still a further object of this invention to provide a sight glass in which possibility of damage to the bonding cohesive is eliminated.

It is still a further object of this invention to provide a sight glass with such construction that glass lining of sight glass elements is eliminated.

SUMMARY OF THE INVENTION

In accordance with the present invention, a sight glass is provided which is similar in construction to that disclosed in the prior art in that it comprises a lens, a lens holding sleeve, and a mounting support. However, the lens holding sleeve and lens are assembled in such a way that the lens is against the gasket on the vessel eliminating the need for glass lining the lens holding sleeve or other portions of the sight glass. This sight glass comprises a lens holding sleeve with an inwardly projecting continuous shelf between the two ends of said sleeve, a lens within said sleeve, a layer of high shear strength cohesive between the edges of the lens and the walls of the lens holding sleeve, a mounting support adapted to receive the lens holding sleeve and adapted to secure the lens holding sleeve to the vessel, and a resilient gasket mounted around the edge of the opening of the vessel and in contact with the lens which is engaged with the opening of the reaction vessel. This particular arrangement not only provides for protection against corrosive materials but also increases the strength and thus the safety of a sight glass used in reaction vessels.

DESCRIPTION OF THE PREFERRED EMBODIMENTS

Figure 1:
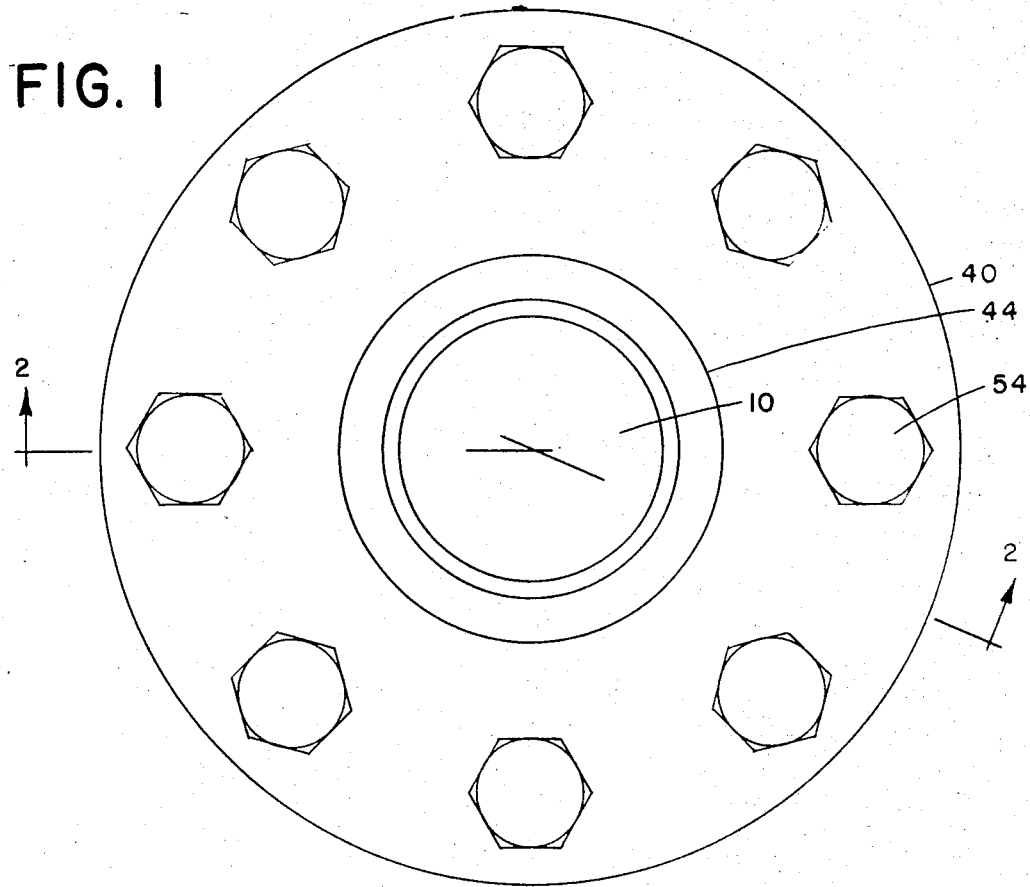
FIG. 1 is a top view of one embodiment of a sight glass, the subject of this invention.
Figure 2:
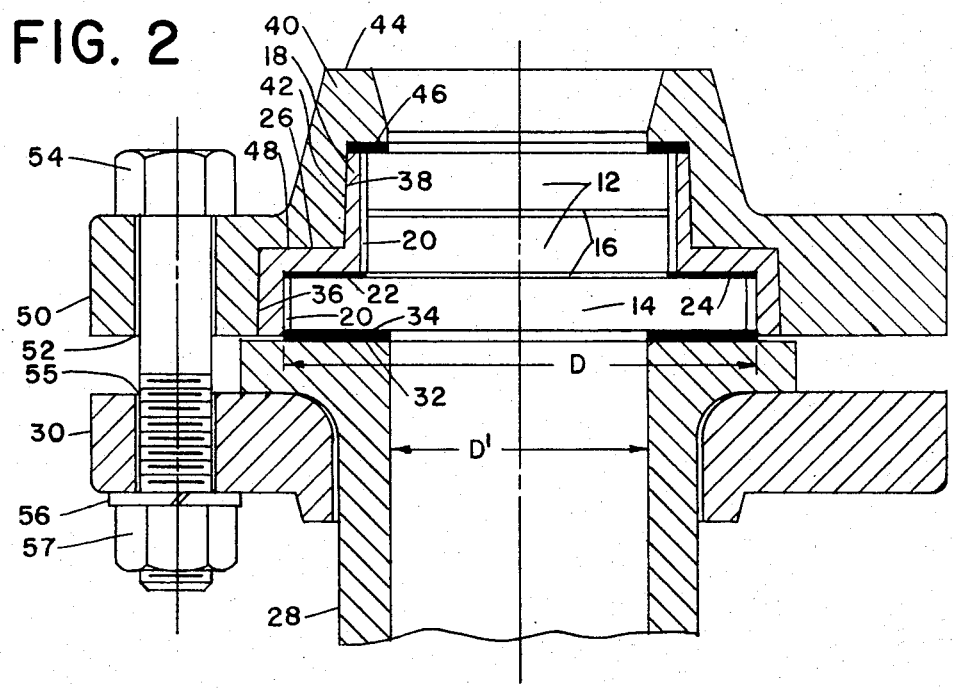
FIG. 2 is a sight glass in section taken along line 2—2 of FIG. 1, wherein the sight glass is shown in engagement with a reaction vessel having a nozzle opening.

Referring now to FIGS. 1 and 2 of the drawings, the sight glass there shown comprises a laminated lens, generally 10, consisting of two discs 12 of tempered glass shielded with a thicker and larger disc 14 of chemically resistant glass or tempered glass. The discs are all precision ground and bonded together at 16 by a heat and light resistant non-rigid laminate. The laminated lens is bonded in annular lens holding sleeve 18, preferably formed of stainless steel, by a glass-metal bond, generally at 20, of a specially compounded high temperature, high shear strength cohesive. The lens holding sleeve is provided with an inwardly projecting shelf 22. The inner diameter D at the end of annular lens holding sleeve 18, which end is closest to nozzle 28, is in excess of the diameter D' of nozzle 28. Mounted beneath said shelf is a resilient gasket 24. The larger disc 14 seals against resilient gasket 24 and substantially fills lens holding sleeve 18 but does not project therebeyond. When the sight glass is assembled, the gasket 24 is in an interposed position between the lens 14 and shelf 22 and seals the space therebetween. Lens holding sleeve 18 is further provided with an outwardly projecting shelf 26 opposite inwardly projecting shelf 22 and the outer surface of the sleeve is slightly tapered at 38. The terms outwardly and inwardly refer to direction from the shoulders of the sleeve. The lens holding sleeve 18 is adapted to engage the walls of mounting support 40.

In order to secure the lens holding sleeve in fixed engagement with the wall of the vessel, there is provided a mounting support 40, preferably of forged steel. The support is provided with substantially centrally disposed bores 42 and 36 having inner and outer ends and shelf 48 and adapted to receive lens holding sleeve 18 from inner end thereof. The bore is slightly tapered from shelf 48 and is terminated at its outer end by an inwardly projecting annular flange 44. A second resilient gasket 46 is mounted on flange 44 within bore 42.

Mounting support 40 is adapted at the portion adjacent the inner end of bore 42 to seat against shelf 26 of lens holding sleeve 18. Thus shelf 48 of support 40 is juxtaposed against shelf 26 of lens holding sleeve 18. The length of bore 42 is such that when the sight glass is assembled, sufficient pressure is exerted against gasket 46 and lens holding sleeve 18 to form an effective seal. Since the lens does not project beyond the end of the sleeve no excess stress is exerted on said sleeve. Mounting support 40 is further provided with an annular base flange 50 having a plurality of bores 52 therein. Mounting bolts 54 are adapted to extend through bores 52 and to be received in bores 55 of flange 30. Each bolt 54 then receives a washer 56 and a nut 57. Flange 30 encircles nozzle 28 and in this manner lens 14 of the lens assembly is secured in fixed engagement with gasket 34 and seat 32 of nozzle 28.

Normally the two tempered glass discs 12 and the larger chemically resistant or tempered glass disc 14 are first assembled and bonded to form a laminated lens. Resilient gasket 24 is placed in position within the lens holding sleeve 18 on the inwardly projecting shelf 22. The laminated lens is inserted into the lens holding sleeve with the chemically resistant or tempered glass disc 14 contacting resilient gasket 24 forming a seal. When the lens is thereafter bonded in place by the glass-metal cohesive, there is produced a unitary lens subassembly of substantial strength. The sleeve, preferably tapered, is thereafter inserted into the matching tapered bores of the lens mounting support 40 with the second resilient gasket 46 already in place to form a completed sight glass. When mounted on the reaction vessel, the chemically resistant or tempered glass disc 14 is in fixed engagement with the gasket 34 and seat 32 of the nozzle 28 and held in place by mounting support 40 by means of bolts 54 received in bores 55 of flange 30 and secured by washers 56 and nuts 57. It is to be noted that disc 14 of the lens assembly does not extend to the same level as the lower end of the lens holding sleeve 18 but is instead slightly recessed to accomodate gasket 34. It is also noted in this configuration that neither the lens holding sleeve nor any other metal part of the sight glass assembly will come in contact with the contents of the vessel. Thus metal corroding material in this vessel cannot damage these parts of the lens assembly.

Figure 3:
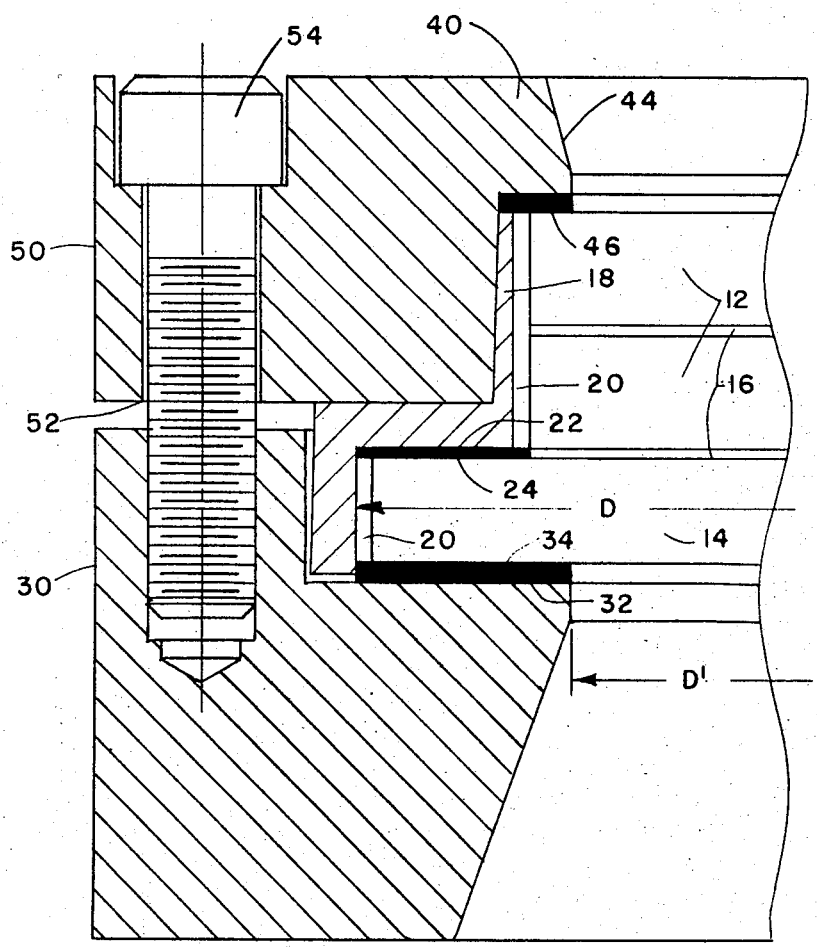
FIG. 3 is a partial sectional view of the sight glass wherein the sight glass is shown integrated with the body of the reaction vessel.

Referring now to FIG. 3 shows a different method of attaching the sight glass to the body of the vessel. This type of sight glass attachment is generally known as the welding pad type. The numbered elements in this figure refer to the numbered elements in FIGS. 1 and 2. In this instance mounting support 40 is provided with a plurality of bores 52 therein. Mounting bolts 54 are adapted to extend through bores 52 and to be received in welding pad 30. In this manner, lens 14 is secured in fixed engagement with gasket 34 and seat 32 of the welding pad 30. This configuration is different from the nozzle type sight glass in only the manner in which it is engaged to the wall of the vessel. This sight glass exhibits the same advantages of strength, safety, and protection from metal corroding material demonstrated in the nozzle type sight glass. Although the sight glass is generally attached to the wall of the vessel either through a nozzel arrangement or on a flange pad other methods of attachment are not to be excluded.

In the above described configuration, the laminated lens should completely fill the lens holding sleeve but should not project beyond the end thereof. If the lens were thicker and projected, the glass would be put under conpression before a tight seal could be made at the end of the sleeve. Each disc of tempered glass is designed for the normal rated working pressure of the lens mounting support. For purpose of description this working pressure is designated as having a value 10 and each of the tempered diecs therefore has a safety factor of 10. This factor of safety may be defined as the ratio, allowed in design, between the breaking load on a member or structure and the safe permissible load thereon. With the use of two tempered glass discs, one supporting the other, a safety factor of the sight glass of this invention is provided. That is, if breakage of one tempered disc should occur, the other will support the vessel pressure until the unit can be replaced. Also by providing two tempered discs during operation of the vessel, the original safety factor is doubled. Also, because lens 14 is larger and projects under the shelf of the lens holding sleeve a substantial increase in safety is provided.

It will be seen from the particular embodiments above illustrated that the sight glass described is much safer than previous art known devices. The shelf feature above illustrated is primarily responsible for such increased strength and safety. Because of such shelf, the possibility of the entire lens structure breaking or blowing out is diminished. It can also be seen that if no metal portion of the sight glass comes in contact with the contents of the reaction vessel that the need for glass lining is eliminated. The gasket 34 interposed between lens 14 and the opening of the reaction vessel are designed to prevent the contents of the vessel from coming into contact with the metal portions of the sight glass.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A sight glass for cooperation with an opening in a vessel, said sight glass comprising:
   a. An annular lens holding shelf having an inwardly projecting continuous shelf between the two ends of said sleeve, the diameter of one end of said annular lens holding sleeve being in excess of that of the opening in said vessel;
   b. A lens received within said sleeve and substantially filling the same, but not projecting therebeyond, the level of the lens further being slightly recessed from the level of the end of the lens holding sleeve nearest the wall of the vessel;
   c. A mounting support having an inwardly projecting annular flange at its outer end and adapted to receive the lens holding sleeve, said support also adapted to secure this lens and lens holding sleeve in fixed engagement with the walls of said reaction vessel and in alignment with said opening such that the end of the lens holding sleeve nearest the wall of said vessel is the end of the lens holding sleeve having a diameter in excess of that of the opening in said vessel; and
   d. A resilient gasket mounted around the edge of the opening of the vessel and in contact with the lens in the lens holding sleeve and sealing the space between the opening and the lens.

2. A sight glass as in claim 1 wherein a resilient gasket is interposed between the shelf of the lens holding sleeve and the lens;

3. A sight glass as in claim 2 wherein a layer of high shear strength cohesive is interposed between the edges of the lens and the walls of the lens holding sleeve bonding the lens to the sleeve.

4. A sight glass as in claim 3 wherein a resilient gasket is interposed between and seals the space between the inwardly projecting annular flange of said mounting support and the lens.

5. A sight glass as in claim 4 wherein the lens comprises at least two discs of tempered glass shielded by a disc of chemically resistant glass, and a layer of non-rigid bond inter-posed between and extending throughout the entire area of each of the opposed faces of said discs to form a laminate;

6. A sight glass as in claim 5 wherein the chemically resistant glass substantially fills that portion of the lens holding sleeve below the shelf and contacts the resilient gasket interposed between the shelf of the lens holding sleeve and the lens;

7. A sight glass as in claim 6 wherein the lens and lens holding sleeve are in fixed engagement with a nozzle opening on the vessel.

8. A sight glass as in claim 6 wherein the lens and lens holding sleeve are in fixed engagement with a welding pad on the vessel.

* * * * *